(12) United States Patent
Ree et al.

(10) Patent No.: US 7,460,523 B2
(45) Date of Patent: Dec. 2, 2008

(54) CLIENT-SERVER ARCHITECTURE FOR THE DELIVERY OF BROADBAND SERVICES

(76) Inventors: Bradley Richard Ree, 2935 Emerson Lake Dr., Snellville, GA (US) 30078; Robert Paul Basil, 435 Woodbrook Way, Lawrenceville, GA (US) 30043; Jeffery Arnold Hales, 3983 Windgrove Crossing, Suwanee, GA (US) 30024

( * ) Notice: Subject to any disclaimer, the term of this patent is extended or adjusted under 35 U.S.C. 154(b) by 881 days.

(21) Appl. No.: 10/657,492

(22) Filed: Sep. 8, 2003

(65) Prior Publication Data

US 2005/0053052 A1   Mar. 10, 2005

(51) Int. Cl.
  *H04L 12/28*  (2006.01)
  *H04L 12/56*  (2006.01)
  *H04J 3/16*  (2006.01)
  *G06F 15/173*  (2006.01)

(52) U.S. Cl. ............... 370/352; 370/346; 370/412; 709/224

(58) Field of Classification Search ......... 370/229–347, 370/352–395, 401–469; 709/224–230
See application file for complete search history.

(56) References Cited

U.S. PATENT DOCUMENTS

| | | | | |
|---|---|---|---|---|
| 6,075,784 | A * | 6/2000 | Frankel et al. | 370/356 |
| 6,304,567 | B1 * | 10/2001 | Rosenberg | 370/356 |
| 6,304,574 | B1 | 10/2001 | Schoo et al. | |
| 6,535,521 | B1 | 3/2003 | Barghouti et al. | |
| 6,765,901 | B1 * | 7/2004 | Johnson et al. | 370/352 |
| 6,788,675 | B1 * | 9/2004 | Yang | 370/352 |
| 7,082,141 | B2 * | 7/2006 | Sharma et al. | 370/493 |
| 7,106,723 | B2 * | 9/2006 | Rabenko | 370/352 |
| 2002/0061012 | A1 * | 5/2002 | Thi et al. | 370/352 |
| 2002/0162116 | A1 * | 10/2002 | Read et al. | 725/106 |
| 2003/0145332 | A1 * | 7/2003 | Furuta | 725/111 |
| 2004/0042444 | A1 * | 3/2004 | Edmon et al. | 370/352 |
| 2004/0213204 | A1 * | 10/2004 | Yang | 370/352 |
| 2004/0264488 | A1 * | 12/2004 | Yoon et al. | 370/412 |
| 2007/0070986 | A1 * | 3/2007 | Rabenko | 370/352 |

* cited by examiner

*Primary Examiner*—M. Phan (57) ABSTRACT

A distributed processing system including one or more modems connected to a server through a network, such as a cable network or other similar network for transporting data and/or voice. The processing applied to information to be transported to a public network, such as the Internet, is performed by the server rather than the modem. Voice services are provided to telephone equipment connected to a modem by digitizing the voice signals and forwarding the signals as packets to the server. The application of a network stack to the voice packets is performed by the server prior to sending the packets over the public network. Likewise, voice packets received from the public network include network stack formatting. The server removes this formatting prior to sending the voice packets to the modem. This significantly reduces the complexity and cost of the modems.

20 Claims, 4 Drawing Sheets

CLIENT-SERVER ARCHITECTURE FOR THE DELIVERY OF BROADBAND SERVICES

CROSS-REFERENCE TO RELATED APPLICATIONS

This application is related to, and incorporates by reference, U.S. patent application Ser. No. 10/205,523 and entitled "METHODS FOR DETECTING AND POLLING DOWNSTREAM MODEMS" which was filed on Jul. 25, 2002 and is commonly assigned.

FIELD OF THE INVENTION

The present invention relates to distributed processing and, more particularly, to distributed processing within a cable network by moving processing functionality into the server from the modems.

BACKGROUND

Traditional telephony has been provided over a dedicated line. For residential service, this has typically been a single twisted pair being fed to the house. For business service, the dedicated line has included either multiple sets of twisted pairs, or trunk lines (such as T1 lines) being fed into a private branch exchange (PBX) type system. End to end connections with traditional telephony consists of circuit switched connections between the originating party and the terminating party. The circuit switched connection is basically a dedicated connection between the parties that is reserved for that particular telephone call. Thus, the bandwidth dedicated for a single connection is reserved for that connection even during times when conversation is idle. The bandwidth is not freed up until the call is terminated.

Recently, alternative forms of telephony service have been introduced. Such alternative forms include digital cellular telephony, satellite telephony and cable telephony.

With the growth of the Internet on a world-wide basis, the ability to deliver data traffic in a reliable and cost efficient manner has been realized. A recent development in telephony has been a merger of telephony services through the Internet infrastructure. The term of art used to describe such telephony service is voice over IP or VoIP. VoIP is in essence, a set of facilities for managing the delivery of voice information using the Internet Protocol. VoIP generally consists of digitizing the analog voice signal and transmitting it from the origination to the destination over the Internet using packet switched technology. Advantageously, the bandwidth absorbed in providing VoIP is limited to what is required to deliver the information rather than having a dedicated line between the communicating parties.

To provide VoIP, many technical hurdles must be overcome. For instance, unlike the delivery of data, the delivery of voice must be performed in close to real time. In addressing this issue, the real-time protocol RTP was developed to ensure that voice packets get delivered in a timely manner. In addition, since the Internet is made up of a countless number of individual entities providing connectivity to each other rather than a single entity closely managing the facilities, it can be difficult to guarantee a particular quality of service (QoS).

In data networks such as the Internet, transmission rates, error rates and other performance impacts can be predicted and, by applying various techniques, can be controlled or limited. Thus, by performing certain techniques, to some extent, the QoS can be improved.

Figures 1, 2:
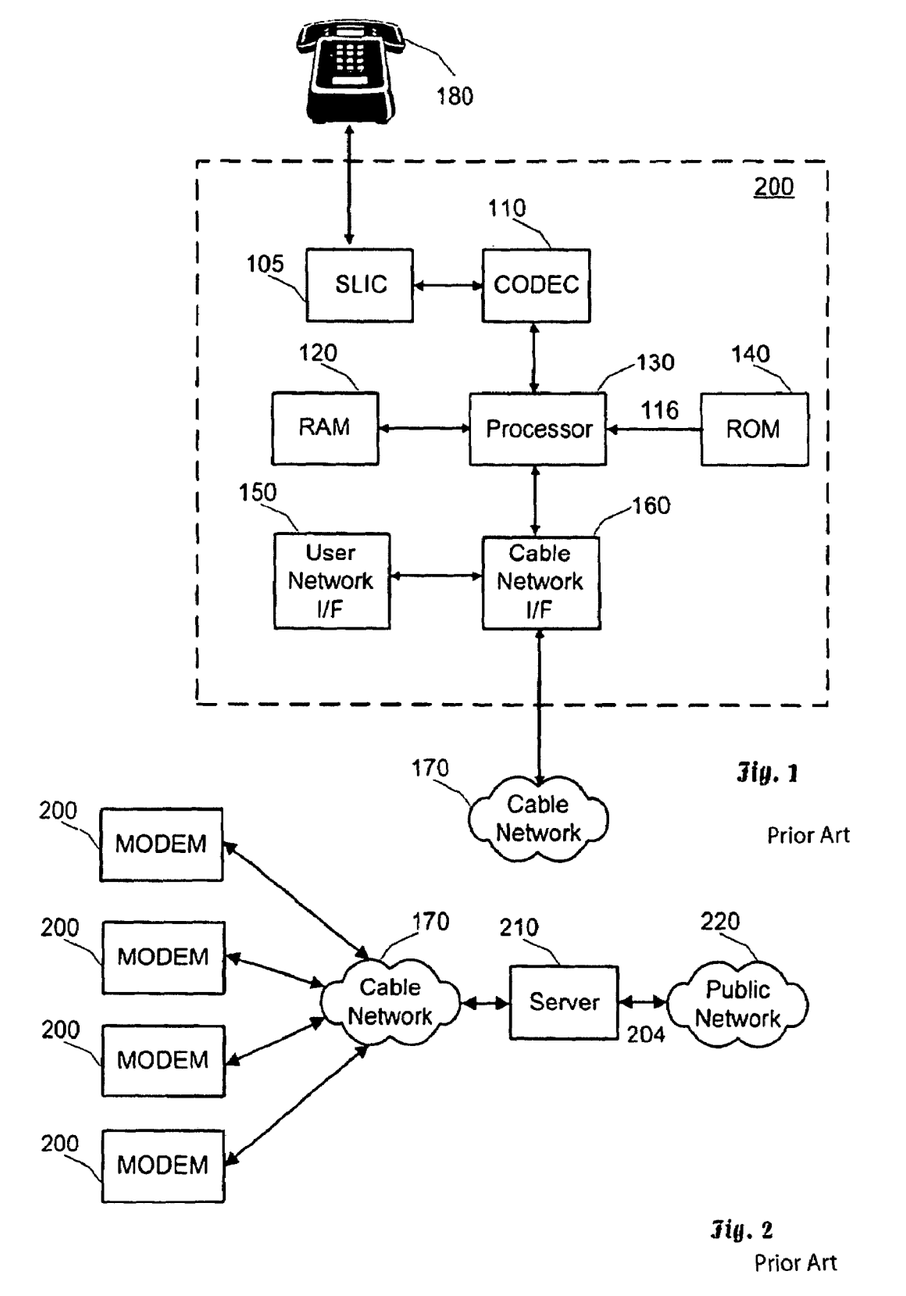
FIG. 1 is a system diagram illustrating a typical configuration for the provision of VoIP through a cable modem network.
FIG. 2 is a block diagram of a typical cable network.

Cable modem networks may also be used to carry VoIP packets and other data between a cable modem termination system and multiple cable modems. Within a cable modem network, a client desiring to utilize VoIP connects to the network through a subscriber line interface. FIG. 1 is a system diagram illustrating a typical configuration of a modem that is utilized for the provision of VoIP through a cable modem network. The subscriber line interface (SLIC) 105 supplies the high voltage interface to an analog telephone 180 (the VoIP client) and provides a bi-directional analog voice stream to a codec 110. Of course, the VoIP service could also be provided for digital type telephones by modifying the interface to the SLIC 105. The codec 110 contains an analog to digital (AD) and digital to analog (DA) converter that is used to provide a bi-directional digital data stream to a processor 130.

The processor 130 is connected to a memory device, such as a read only memory device (ROM) 140, which contains the program being executed by the processor 130. The processor 130 may also interface with a random access memory (RAM) device 120 for the temporary storage of variables and other data. The program being executed by the processor 130 consists of a network stack that provides an IP link between a cable network 170, and the telephone 180. The network stack also runs two VoIP protocols: Session Initiation Protocol (SIP), and real time protocol (RTP). SIP is used to initiate phone calls between two VoIP users, and to terminate the call at its completion. RTP is used to transport the voice data, or compressed voice data, in a packetized format. Each packet typically contains 20 ms of voice data. The processor 130 is connected to the cable network 170, through a cable network interface 160. The cable network interface 160 maintains the link to the cable network 170, and provides for data flow to the processor 130. Typically a cable modem will also include a user network interface 150. Through the user network interface 150, the user may connect one or more computers, and communicate through the cable network 170.

FIG. 2 is a block diagram of the provision of Internet access through a typical cable network. The cable network 170 connects one or more modems 200 to a single server 210. The server provides an interface to a public or other network 220, such as the Internet, in which many other networks are connected. If a large number of modems 200 are connected, and the processing power of the server 210 is limited, then this type of approach works well. In this case, all telephony is handled at the modem 200 and the server 210 only see IP traffic. However, in this configuration, there is no quality of service, and thus the voice packets could be slowed down due to processing the data traffic, thereby resulting in poor sound quality.

To support voice, the modems 200 need to have additional processing power. Providing this increased processing power also increases the cost of the modem. However, at any given time, not all of the modems 200 will be supporting a telephone call, and thus, most of the processors located in the modems 200 will be inactive or under-utilized. As a result, the amount of processing power to conduct most networks is much less than the processing power per modem multiplied by the number of modems. Therefore, there is a need in the art for a technique that allows such a cable network to support voice, but provides a more cost effective solution for meeting the processing power demands.

SUMMARY OF THE INVENTION

The present invention provides a solution to the aforementioned problems by redistributing processing requirements from modems within a cable network to a server. One embodiment of the present invention involves the implementation of a protocol stack, SIP and RTP functionality within a server that communications with a plurality of modems in a cable modem network. The individual modems simply include a voice interface circuit that packetizes digitized voice and forwards the voice to the server for further processing. In addition, the voice interface circuit receives packets of digitized voice from the server and delivers the voice to a telephone. Thus, the present invention allows the cost and complexity of the modems to be greatly reduced.

More specifically, the modems use packet types to identify the types of packets being sent to and received from the server. Based on the packet types, the server is able to process the received data in a manner to provide a high quality of service. For instance, voice data packets can be processed at a higher priority and thus, improve the voice quality.

Other features and advantages of the present invention will become apparent upon reading the following detailed description of the embodiments with the accompanying drawings and appended claims.

DETAILED DESCRIPTION OF THE INVENTION

The present invention provides a configuration of modems connected to a server through a network that allows for processing tasks, typically performed by a modem, to be performed by the server. The present invention is adaptable for use in a variety of configurations and can be utilized in a variety of network types, such as a cable network or other similar network. In general, the present invention allows for the simplification of modems by adding more functionality into the server.

In one embodiment of the present invention, the modems are connected to the server though a cable network and can be interfaced to telephone subscriber equipment to provide telephony service. In operation, the modem interacts with the telephone subscriber equipment to detect events, such as off-hook and on-hook conditions, the dialing of numbers and the presentation of audio signals. The modem simply converts the events and audio signals into digital packets and delivers the digital packets to the server for further processing. The server includes all the functionality to convert the digital packets into networked stacked packets that can be transported over a packet switched network, such as the Internet, to a destination. In addition, the server operates to receive network stacked packets from the packet switched network, remove the network stack formatting from the packets and deliver them to the modem over the cable network.

As will be further disclosed below, the present invention can also be used to distribute processing for the provision of other services. For instance, the provision of user interface functions can be processor intensive and result in an increase in the complexity and cost of a modem.

Referring now to the drawings, in which like numerals refer to like elements throughout the several views, exemplary embodiments of the present invention are described. In general, the present invention provides for an improvement in the delivery of various services in a cable network by moving processing power from the modems within the cable network to the server. Likewise, the improvement can be realized by moving the processing power from the modems into CMTS headend, or a server residing within the same. Advantageously, this invention reduces the cost associated with the deployment of cable networks without impacting the performance of the networks.

More specifically, one embodiment of the present invention is particularly suited for providing cable telephony within a cable network setting to a plurality of users. In this embodiment of the invention, a proprietary protocol technique is used for communication between the modems in the cable network and a server. Voice packets are delivered to the server from the cable modems and the server processes them using either a SIP or RTP routine. Advantageously, multiple users can pass data through the same SIP and RTP program running on the server.

Another embodiment of the present invention is particularly suited for providing server based applications to the modems and users within a cable network. In this embodiment of the invention, a proprietary protocol or modification to a protocol is used to deliver various data and control packets between the server and the user modems. The data and control packets are configured in such a manner to allow the user modems to actuate an application on the server. Advantageously, this embodiment of the present invention allows the user modems to access server based applications without impacting the performance characteristic of the cable network and allows configuration and access control to the various server based applications.

Figure 3:
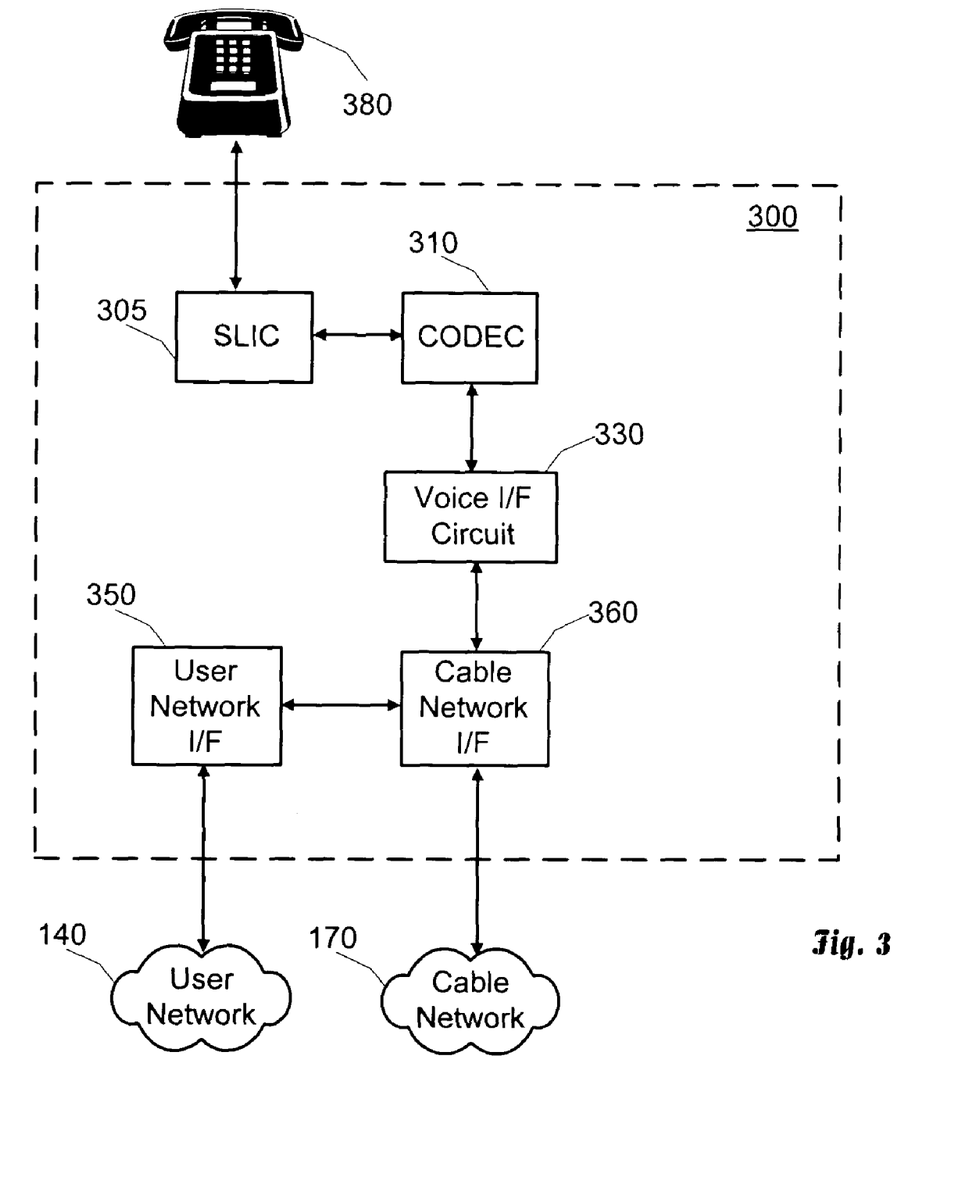
FIG. 3 is a block diagram of a modem suitable for implementing embodiments or portions of the present invention.

FIG. 3 is a block diagram of a modem suitable for implementing embodiments or portions of the present invention. The modem 300 provides connectivity between a telephone unit 380 and a communication network 170. The communication network can be based on a variety of technologies and in an exemplary embodiment, the communication network 170 is a cable network 170. The telephone unit 380 interfaces to the modem 300 through a SLIC 305. The SLIC provides bi-direction communication to a CODEC 310 that includes analog-to-digital and digital-to-analog converters. The SLIC 305 and the CODEC 310 can be configured to interface with a variety of telephone unit types including analog telephones, digital telephones and wireless telephones. In addition, the modem can be configured to interface to multiple telephone units.

Digital voice signals are passed between the CODEC 310 and a voice interface circuit 330. The voice interface circuit is substantially less complicated and expensive than the processors that are utilized in the prior art modem technology. The voice interface circuit 330 captures a set amount of voice samples, and puts the data into a voice data packet. The voice data packet consists only of the data, and a packet type indicator. The voice interface circuit transmits and receives voice packets through the cable network 170 through a cable network interface 360. The voice interface circuit 330 does not require the ability to apply a network stack to the voice packets.

The cable network interface 360 can also interface to data communication equipment connected to a local network or user network 140 through a user network interface 350. Thus, the modem 300 can provide support to telecommunication equipment and data processing equipment.

Figure 4:
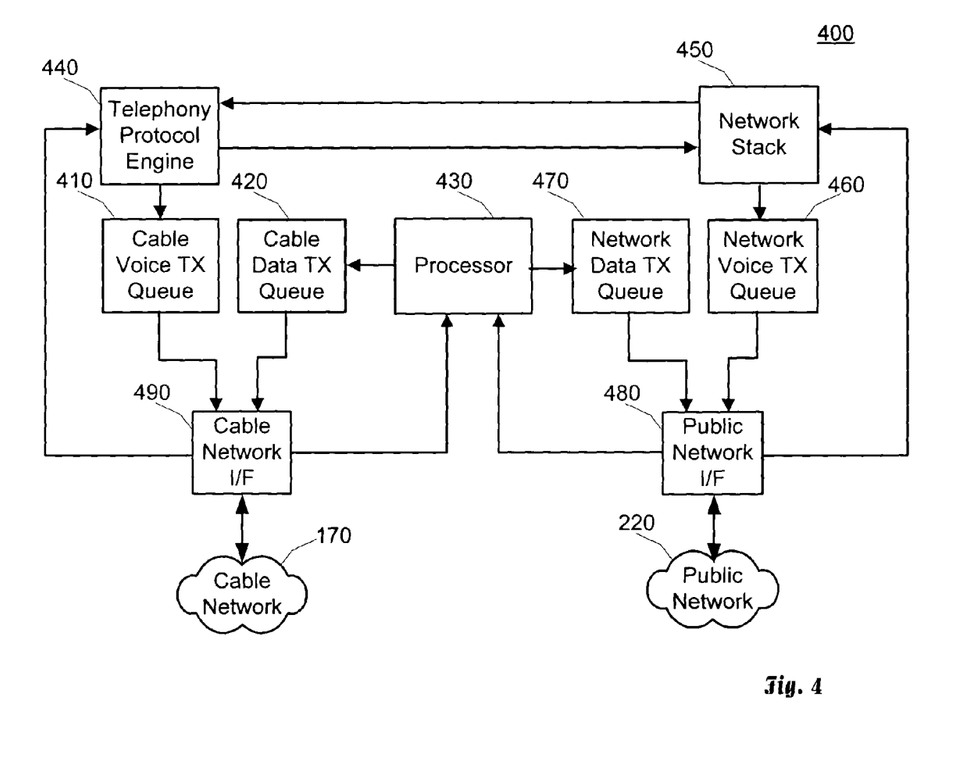
FIG. 4 is a block diagram of a server suitable for implementing embodiments of portions of the present invention.

FIG. 4 is a block diagram of a server suitable for implementing embodiments of portions of the present invention. The server 400 resides between a communication network 170 and a packet network 220. The communication network 170 can be based on a variety of technologies and in an exemplary embodiment, is a cable network. The packet network 220 can also be based on a variety of technologies but, in general supports packet switching. A typical example of a packet network 220 is the Internet. The server 400 includes a processor 430 that provides data to a cable data transmit queue 420 and a network data transmit queue 470. The processor 430 also receives data from a cable network interface 490 and a public network interface 480. The server 400 includes a telephony protocol engine 440 that receives voice packets from the cable network 170 through a cable network interface 490 and sends voice packets to the cable network 170 through a cable voice transmit queue 410 and the cable network interface 490. The telephony protocol engine 440 interfaces to a public network 220 through a network stack 450. The network stack 450 operates to receive voice packets from the public network interface 480 and transmit voice packets to the public network 220 through the network voice transmit queue 460 and the public network interface 480. The cable network interface 490 is responsible for pulling data packets from the cable voice transmit queue 410 and the cable data transmit queue 420. Under software control, the priorities assigned to these queues, as well as processing priorities assigned to various packet types within these queues, can be adjusted to allocate bandwidth and quality of service as required. Likewise, the public network interface 480 is responsible for pulling data packets from the network data transmit queue 470 and the network voice transmit queue 460. Under software control, the priorities assigned to these queues, as well as processing priorities assigned to various packet types within these queues can be adjusted to allocate bandwidth and quality of service as required. In one embodiment of the invention, if a voice packet is presently in one of the voice transmit queues, the appropriate network interface will give priority to the transmission of that packet over a packet that may be stored in the data transmit queues.

Figure 5:
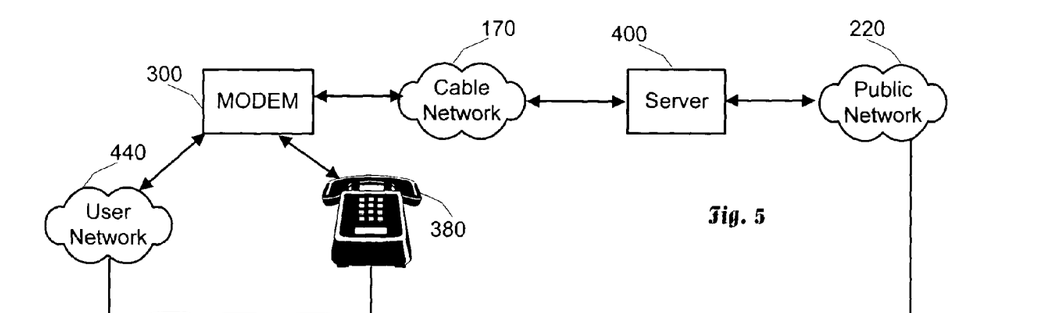
FIG. 5 is a block diagram illustrating the use of the modem of FIG. 3 and the server of FIG. 4 to implement an embodiment of the present invention.
Figure 6:
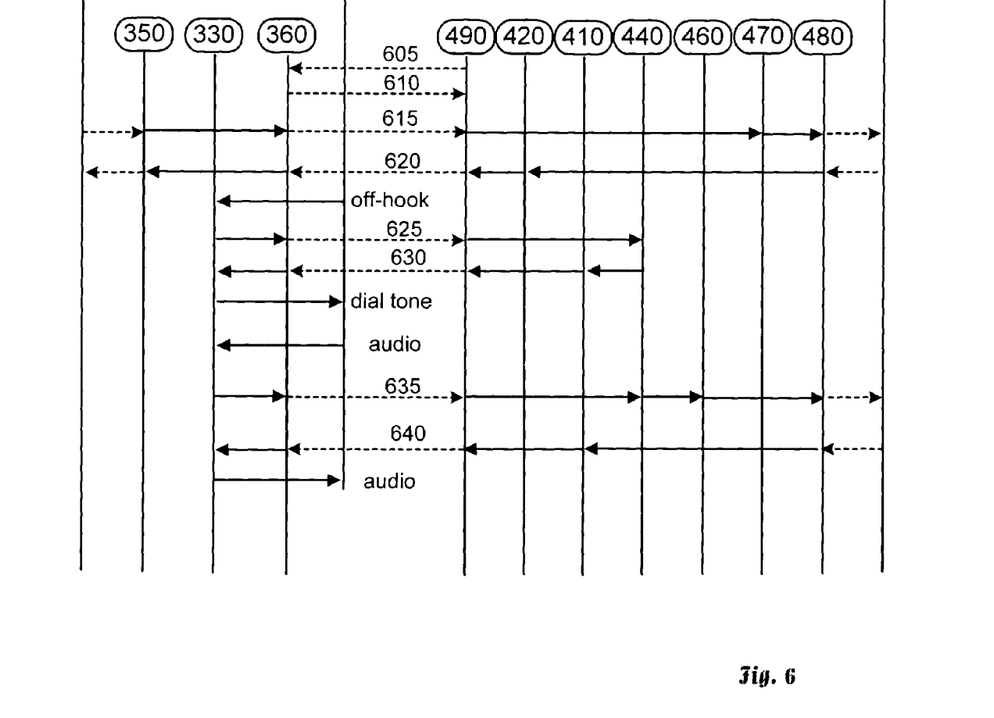
FIG. 6 is a timing diagram illustrating the flow of information within the components of FIG. 5.

FIG. 5 is a block diagram illustrating the use of the modem of FIG. 3 and the server of FIG. 4 to implement an embodiment of the present invention. It should be noted that several modems 300 can be connected to a server 400 but for simplicity, only a single is modem is being illustrated. FIG. 6 is a timing diagram illustrating the flow of information within the components of FIG. 5.

Communication between the modem 300 and the server 400 is conducted by exchanging packets. In an exemplary embodiment, four types of packets are utilized: (1) user data, (2) user data control, (3) voice data, and (4) voice control. However, those skilled in the art will realize that other packet types could also be supported and the listing of these four packet types is for illustrative purposes only. User data control packets are used to configure and control the user data path in the modem 300. For example, in one embodiment, before a modem can transmit or receive user data, the server 400 must first enable the modem 300. The modem 300 is enabled in response to receiving an enable user data control packet 605 from the server 400. The enable user data control packet is generated in the processor 430 and is then placed into the cable data transmit queue 420. If there are no voice data packets to be sent from server's cable voice transmit queue 410, the server's cable network interface 490 will read the enable user data control packet 605 from the cable data transmit queue 420, and send the packet across the cable network 170 to the modem 300. The cable network interface 360 of the cable modem 300 receives the enable user data control packet 605 and then sends a user data control type packet response 610 back to the server 400. The cable network interface 360 generates the user data control response packet 610, and sends it to the server 400 through the cable network 170. The cable network interface 490 of the server 400 receives the user data control response packet 610, and detects the packet type, and forwards the packet to the data processor 430. At this point, the data path between the modem 300 and the server 400 is enabled.

User Data Packet Flow

The data and data control packets are passed between the cable network 170, and the user network interface 350, through the cable network interface 360. When a user data packet 615 is received by the user network interface 350 in the modem 300, the packet is sent to the cable network interface 360 to be transmitted to server 400 through the cable network 170. However, if a voice packet needs to be transmitted from the voice interface circuit 330, then transmission of the user data packet can be delayed until the voice packet has been sent. In addition, only certain types of voice packets in the voice interface circuit 330 can be given this priority. For instance, if the modem 300 is supporting multiple telephone devices, voice packets from one telephone device can be given priority over voice packets from another telephone device. In addition, data packets may be given priority over voice packets from one telephone device but have a lesser priority over voice packets from another telephone device. The cable network interface 490 of the server 400 will receive the user data packet 615, and then forward the user data packet 615 to the processor 430. The processor 430 may perform network address translation on the packet, and then stuff the data into the network data transmit queue 470. If the server is operating in bridge mode, the processor 430 will immediately send the user data packet to the network data transmit queue 470. The network interface 480 then operates to read the user data packet 615 from the network data transmit queue 470, if there are no voice data packets present in the network voice transmit queue 460, and then transmits it to the public network 220.

User data packets 620 received from the network 220 at the network interface 480, are forwarded to the processor 430 within the server 400. The processor 430 may or may not perform address translation on the user data packet 620, and regardless, it is then placed into the cable data transmit queue 420. The cable interface 490 will read the user data packet 620 from the cable data transmit queue 420 and forward the data packet 620 to the modem 300 through the cable network 170. The cable interface 490 can also read voice data packets from the voice transmit queue and give priority to the voice data packets over the user data packet 620. In the preferred embodiment, the voice data packets are always given priority over data packets to ensure a quality of service. Thus, if there are voice data packets in the voice transmit queue 410, the cable interface 490 will transmit the voice data packets prior to transmitting the user data packet 620. Once the user data packet 620 is transmitted, the cable interface 360 in the modem 300 receives the user data packet 620. If the cable interface 360 determines that the packet 620 is a user data packet type, the cable interface 360 forwards the user data packet to the user network interface 350, which will then deliver the packet across the user network to the appropriate data communication device.

Voice Data Packet Flow

The voice control and voice data packets are passed between the cable network 170, and the voice interface circuit 330 through the cable network interface 360. As previously mentioned, the cable network interface 360 can give preference to any voice data packet over the user data packets. The voice interface circuit 330 is substantially less complicated and expensive than the processor 130 and supporting hardware in the prior art methods. The voice data packets do not contain any IP headers, and thus require very little processing by the modem.

The server 400 detects the voice control and voice data packet types. If either of these packets is received from the cable network 170, the server 400 will process them using either the SIP or RTP routines running on the processor 430. In the prior art servers, there typically is a network stack running on the server's processor; however, they do not include a SIP or RTP routine since the voice processing is performed at the modem rather than at the server. However, in the exemplary embodiment, the network stack is present in the server and the SIP and RTP routines are modified in such a manner to allow many users' to pass data through the same SIP and RTP program running on the processor 430.

In operation, when the user picks up the receiver of the telephone 380, an off-hook status is detected by the SLIC 305 of modem 300. The off-hook status is conveyed to the codec 310, and this information is sent to the voice interface circuit 330. The voice interface circuit 330 builds a voice control packet 625 and forwards the voice control packet 625 to the cable network interface 360. The cable network interface 360 will transmit the voice control packet 625 to the server 400 through the cable network 170. The cable interface 490 of the server 400 will receive the voice control packet 625, and forward the voice control packet 625 to the telephony protocol engine 440. In anticipation of opening a voice connection, the telephony protocol engine 440 can then configure the cable interface 490 to allow for higher transfer rates to the modem 300 while the telephone 380 is in the off-hook state. The telephony protocol engine 440 also formulates a voice control packet 630 to be sent to the modem 300. This voice control packet 630 instructs the modem 300 to turn on the dial tone. The telephony protocol engine 440 then stuffs the voice control packet 630 into the cable voice transmit queue 410. The cable interface 490 reads the voice control packet 630 from the cable voice transmit queue 410, and transmits it to the modem 300 over the cable network 170. The cable network interface 360 of the modem 300 receives the voice control packet 630 from the cable network 170. The voice control packet 630 is then forwarded to the voice interface circuit 330. The voice interface circuit 330, in response to receiving the voice control packet 630, notifies the codec 310 to generate a dial tone. The codec 310 then generates the dial tone and provides the dial tone to the SLIC 305. The SLIC 305 amplifies the dial tone and provides it over an audio path to the telephone 380.

When the user dials a destination number, the SLIC 305 detects the digits and provides them to the CODEC 310. The CODEC 310 converts the dialed digits to digital signals and provides them to the voice interface circuit 330. The voice interface circuit forms the dialed digits into a voice control packet and delivers the voice control packet to the server 400 in the manner described for the off-hook indications. Once the phone number is received by the telephony protocol engine 440 in the server 400, a connection request is generated. The connection request is provided to the network stack 450. The network stack 450 puts the connection request into an IP packet, or some other network stack format, then stuffs the network stacked packet into the voice transmit queue 460. The public network interface 480 reads the network stacked packet connection request from the voice transmit queue 460 and transmits the network stacked packet to a destination on the public network 220. When a response packet is received from the destination on the public network 220, the network interface 480 will determine the type of packet and forward the response packet to the network stack 450. The network stack 450 verifies the integrity of the packet, and removes the network protocols. The packet is then passed to the telephony protocol engine 440 to establish the connection. After the connection is established using the telephony protocols, voice data is allowed to flow through the system.

For voice signals being directed from the telephone 380 to a destination on the public network over the connection, the analog voice is received into the SLIC 305. The SLIC 305 provides a low voltage signal of the voice to the CODEC 310. The CODEC 310 samples the analog signal and generates a digital stream of data that is sent to the voice interface circuit 330. The voice interface circuit 330 places the digital data into voice data packets 635. Each voice data packet 635 is provided to the cable network interface 360. The cable network interface 360 transmits each voice data packet 635 to the server 400 over the cable network 170. The cable network interface 490 in the server 400 receives the voice data packets 635, determines the packet type, and then provides the voice data packets 635 to the telephony protocol engine 440. Each voice data packet 625 is then wrapped in a telephony transport protocol, and passed the network stack 450. The network stack 450 wraps the telephony transport protocol packet with an IP packet or other appropriate stack, and places it into the network voice transmit queue 460. The public network interface 480 reads the IP packets from the network voice transmit queue 460, and then transmits the IP packets to the destination through the public network 220.

For voice signals being directed from the destination on the public network 220 to the telephone 380, voice data IP packets 640 are received by the public network interface 480 of the server 400. The public network interface 480 determines the packet type of the received packets and then forwards the voice data IP packets to the network stack 450. The network stack 450 strips the IP protocol from the voice data packets and sends telephony transport protocol packets to the telephony protocol engine 440. The telephony protocol engine 440 converts the telephony transport protocol packets into a voice data packet and places the packets into the cable voice transmit queue 410. The cable network interface 490 in the server 400 pulls the voice data packets from the cable voice transmit queue 410 and transmits them to the modem 300 over the cable network 170. The cable modem interface 360 in the modem 300 receives data packets from the cable network 170, detects the packet type, and forwards the voice data packets to the voice interface circuit 330. The voice interface circuit 330 removes the voice data from the packets and provides a digital stream to the CODEC 310. The CODEC 310 converts the digital data into analog signals and provides the analog signals to the SLIC 305. The SLIC 305 amplifies the analog signals and delivers them to the telephone set 380.

Similarly, calls can be originated from a device on the public network 220. In this scenario, the public network interface 480 in the server 400 detects a voice control packet and forwards the packet to the network stack 450. The network stack 450 strips the IP protocol from the packet and provides the telephone protocol packet to the telephone protocol engine 440. The telephony protocol engine 440 identifies the destination number for the origination request and if the number is supported, formulates a ring request packet and places it into the cable voice transmit queue 410. The cable network interface 490 in the server 400 reads the ring request packet from the cable voice transmit queue 410 and transmits it to the modem 300 through the cable network 170. The cable network interface 360 in the modem 300 receives packets from the cable network 170 and upon detecting a ring request packet, forwards the packet to the voice interface circuit 330. The voice interface circuit 330 instructs the CODEC 310 to generate a ring tone. The CODEC 310 generates the ring tone and provides the signal to the SLIC 305. The SLIC 305 then amplifies the signal and actuates the ringer on the telephone 380. Once the telephone 380 goes off-hook, processing continues as described above with regards to the detection of an off-hook condition.

Thus, it can be seen that the present invention operates to provide a voice capability within a cable network in a manner that reduces the cost of the individual cable modems within the cable network but does not impact the performance. The modems within the cable network are not required to include a voice processor or a network stack. Rather, a much less complicated circuit is used to process the voice data and the processor intensive processing is moved into the server. It should be appreciated that this aspect of the invention operates to provide VoIP as well as with other transports. The present invention can be implemented over a variety of technologies, including but not limited to coaxial, twisted pair, fiber and wireless technologies. Thus, by modifying the capabilities of the network stack 450, any transport could be supported.

Another advantage of the present invention is the use of packet types to distinguish between processing required for the various packets. One implementation of this aspect of the invention was described above with relationship to the detection of a voice control packet to indicate an off-hook condition. The present invention operates to reallocate bandwidth and/or processing power in response to this packet to allow for a higher quality of service for the real-time requirements of voice data packets. This aspect of the invention can also be used to move processing requirements for other operations from the cable modems into the server. One such implementation is realized by transferring user interface functionality from the modem into the server. For instance, in a video on demand scenario, the channel change requests (i.e. channel up or channel down) can be implemented within the server. This allows the modem to be tuned t o a single channel and removes some of the channel changing complexities out of the modems and into the server.

In a streaming audio scenario, a particular amount of bandwidth is dedicated to providing the audio stream to the user. In the prior art methods, when the user requests the audio to be muted, the modem interrupts the feed of audio to the end device. The bandwidth between the server and the modem is still utilized since the audio is still fed to the modem. However, utilizing the present invention, the mute button would generate a data control packet that is sent to the server. The server can then operate to stop the audio stream and free up the bandwidth for other uses during the muted period.

Another advantage of the present invention is that the server can be used to assign priorities to the various packets flowing through the cable network and hence, prioritize functionality of the system or provide prioritization to certain interfaces. For instance, two data communication devices connected to the same cable modem can be assigned different priorities. In operation, more bandwidth can be allocated to one of the data communication devices and thus, provide better performance capabilities to that device. The server provides this capability by detecting packets from the higher priority data communication device and either pushing the packets towards the front of the queue or allocating additional bandwidth to the data communication device.

Thus, it has been shown that the present invention advantageously reduces the complexity and cost of modems deployed within a cable network by moving processing requirements from the modems into the server. Utilizing packet types to distinguish between data and voice packets, or to otherwise distinguish the packets, the server can allocate the necessary resources to process the packets in a manner to provide quality of service. Although the present invention has been predominantly described as operating within a cable network environment, those skilled in the art will readily see that the present invention can also operate within a DSL network, T1, or other similar network environments. In addition, the present invention has been described as operating on data and voice packets. However, those skilled in the art will appreciate that the present invention can also be applied to the transmission of video, streaming audio or the like, and not restricted to simply working with voice transmissions.

In the description and claims, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of skilled in the art. The scope of the invention is limited only by the following claims.

What is claimed is:

1. A modem for use in a network, the modem being suited for interfacing to telephone subscriber equipment and providing voice functionality, the modem comprising:

a subscriber line interface for interfacing to the telephone subscriber equipment;

an encoder/decoder coupled to the subscriber line interface;

a voice interface circuit coupled to the encoder/decoder;

a communication network interface coupled to the voice interface circuit;

the voice interface circuit being operable to receive digital signals representative of audio signals generated by the telephone subscriber equipment, format the digital signals into voice packets, and provide the voice packets to the communication network interface;

the voice interface circuit being operable to receive voice packets representative of audio signals from the communication network interface, remove formatting from the voice packets to create digital signals and provide the digital signals to the encoder/decoder;

the communication network interface operable to transmit and receive voice packets over the communication network without applying and removing network stack formatting; whereby the modem does not require a network stack;

the modem further comprising a local network interface coupled to the communication network interface, and wherein the communication network interface is operable to:

transmit and receive data packets over the communication network without the application and removal of applying and removing network stack formatting;

provide data packets received from the communication network to the local network interface; and provide data packets received from the local network interface to the communication network.

2. The modem of claim 1, wherein the communication network interface is further operable to give priority to voice packets over data packets.

3. The modem of claim 1, wherein the voice packets and data packets include a packet type and the communication network interface is further operable to:

identify the packet type comprising a voice packet type and a data packet type' operate on the packet in accordance with the packet type; and give an increased priority to voice packets over data packets.

4. The modem of claim 1, wherein the subscriber line interface and the encoder/decoder are operable to interface to analog telephone subscriber equipment.

5. The modem of claim 1, wherein the subscriber line interface and the encoder/decoder are operable to interface to digital telephone subscriber equipment.

6. The modem of claim 1, wherein the subscriber line interface and the encoder/decoder are operable to interface to wireless telephone subscriber equipment.

7. The modem of claim 1, wherein the communication network is based on coaxial technology.

8. The modem of claim 1, wherein the communication network is based on twisted pair technology 9. The modem of claim 1, wherein the communication network is based on fiber technology.

10. The modem of claim 1, wherein the communication network is based on wireless technology.

11. A server for providing voice functionality over a packet network, the server comprising:

a communication network interface' a packet network interrace;

a network stack; and the server being operable to:

receive and transmit voice packets from and to a plurality of modems through a communication network at the communication network interface;

receive and transmit networked stacked voice packets from and to a plurality of destinations through a packet network at the packet network interface;

for voice packets received from a modem, applying a network stack to the voice packet prior to transmitting the networked stacked voice packet to a destination on the packet network; and for network stacked voice packets received from the packet network, removing the network stack information prior to transmitting the voice packet to a modem;

wherein the voice packets and data packets include a packet type and the server is further operable to:

identify the packet type comprising a voice packet type and a data packet type; operate on the packet in accordance with the packet type; and give an increased priority to processing voice packets over data packets.

12. The server of claim 11, wherein the server is further operable to:

receive and transmit data packets from and to a plurality of modems through the communication network at the communication network interface; and receive and transmit data packets from and to a plurality of destinations through the packet network at the packet network interface.

13. The server of claim 11, wherein the voice packets and data packets include a packet type and the server is further operable to:

identify the packet type comprising a voice packet type, voice control packet type, data packet type and a data control packet type;

operate on the packet in accordance with the packet type; and give an increased priority to voice packet types and voice control packet types over data packet types and data control packet types.

14. The server of claim 13, wherein upon reception of a voice control packet type from a particular modem indicating that the modem is sending an offhook signal, the server increases the bandwidth for communicating with the particular modem.

15. The server of claim 13, wherein the communication network is a cable network.

16. The server of claim 11, wherein the voice packets and data packets include a packet priority and the server is further operable to give an increased priority to processing packets based on the packet priority.

17. In a cable network comprising a plurality of cable modems connected to a server through the cable network, a method for distributing the processing required to deliver for delivery of services to end user devices, the method comprising:

a modem receiving a service request from an end user device interfaced to a modem;

formatting the service request into one or more packets;

assigning a packet type to the one or more packets; and delivering the one or more packets to a server over the cable network; the server receiving the one or more packets from the modem;

identifying the packet type of the one or more packets;

and if the packet is a voice packet, applying a network stack to the voice packet;

and delivering the networked stacked voice packet to a destination over a packet network;

wherein the modem interfaces to a plurality of telephone subscriber equipment, and the modem assigning a packet type further comprises assigning a unique voice packet type to digitized voice signals from each of the plurality of telephone subscriber equipment and a unique voice control packet type to packets indicating that each telephone subscriber equipment is offhook and onhook.

18. The method of claim 17, wherein the modem interfaces to telephone subscriber equipment, and the step of the modem assigning a packet type further comprises the step of assigning a voice packet type to digitized voice signals and a voice control packet type to packets indicating that the telephone subscriber equipment is offhook and onhook.

19. The method of claim 17, wherein the server interfaces to a packet network and further comprises the steps of:

the server receiving a packet from the packet network, the packet being destined for an end user device connected to a modem;

identifying the packet type of the received packet;

if the packet type is a voice packet, removing network stack information from the voice packet prior to forwarding the packet to the modem servicing the end user device and giving priority to delivering the voice packet over the delivery of any data packets;

if the packet type is a data packet, forwarding the data packet to the modem.

20. A system for distributing the processing for providing services to end user devices attached to a cable network through a modem, the system comprising:

a modem; and a server in communication with the modem over a cable network;

the modem comprising:

a subscriber line interface for interfacing to telephone subscriber equipment;

an encoder/decoder coupled to the subscriber line interface;

a voice interface circuit coupled to the encoder/decoder;

a modem cable network interface coupled to the voice interface circuit;

the voice interface circuit being operable to receive digital signals representative of audio signals generated by the telephone subscriber equipment format the digital signals into voice packets, and provide the voice packets to the modem cable network interface;

the voice interface circuit being operable to receive voice packets representative of audio signals from the modem cable network interface, remove formatting from the voice packets to create digital signals and provide the digital signals to the encoder/decoder;

the modem cable network interface operable to transmit and receive voice packets over the cable network without the application and removal of network stack formatting; and a server for providing voice functionality over a packet network, the server comprising:

a server cable network interface;

a packet network interface;

a network stack; and the server being operable to:

receive and transmit voice packets from and to the modem through the cable network at the server cable network interface;

receive and transmit networked stacked voice packets from and to a plurality of destinations through a packet network at the packet network interface;

wherein the voice packets and data packets include a packet type and the server is further operable to:

identify the packet type comprising a voice packet type and a data packet type; operate on the packet in accordance with the packet type; and give an increased priority to processing voice packets over data packets.

* * * * *